United States Patent
Lacko et al.

(10) Patent No.: US 11,548,653 B2
(45) Date of Patent: Jan. 10, 2023

(54) SUPPORT STRUCTURE FOR INNER COWLS OF AN AIRCRAFT PROPULSION SYSTEM

(71) Applicant: Rohr, Inc., Chula Vista, CA (US)

(72) Inventors: Anthony Lacko, San Diego, CA (US); Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 44 days.

(21) Appl. No.: 17/060,640

(22) Filed: Oct. 1, 2020

(65) Prior Publication Data

US 2021/0316872 A1    Oct. 14, 2021

Related U.S. Application Data

(60) Provisional application No. 62/912,357, filed on Oct. 8, 2019.

(51) Int. Cl.
*B64D 29/06*  (2006.01)
*F02C 7/00*  (2006.01)

(52) U.S. Cl.
CPC ............... *B64D 29/06* (2013.01); *F02C 7/00* (2013.01)

(58) Field of Classification Search
CPC ..... B64D 29/06; B64D 2027/264; F02C 7/00; F01D 25/265; F01D 25/28; F01D 25/26
See application file for complete search history.

(56) References Cited

U.S. PATENT DOCUMENTS

| | | | | |
|---|---|---|---|---|
| 4,044,973 A * | 8/1977 | Moorehead | ............ | B64D 27/20 244/54 |
| 5,910,094 A * | 6/1999 | Kraft | ......................... | F02C 7/25 60/39.091 |
| 7,255,307 B2 * | 8/2007 | Mayes | .................... | B64D 29/06 244/129.5 |
| 8,162,254 B2 * | 4/2012 | Roche | .................... | B64D 29/08 244/54 |
| 8,272,595 B2 * | 9/2012 | Ramlaoui | .............. | B64D 29/08 244/54 |
| 8,356,769 B2 * | 1/2013 | Roche | .................... | B64D 27/18 244/54 |
| 9,404,507 B2 | 8/2016 | Scarr | | |
| 9,650,917 B2 | 5/2017 | Stewart | | |
| 9,714,627 B2 | 7/2017 | Lacko | | |

(Continued)

OTHER PUBLICATIONS

EP search report for EP20200908.0 dated Mar. 3, 2021.

*Primary Examiner* — Kenneth Bomberg
*Assistant Examiner* — Adam W Brown
(74) *Attorney, Agent, or Firm* — Getz Balich LLC

(57) ABSTRACT

A nacelle is provided that includes an outer structure and an inner structure. The inner structure includes a support structure, a first core cowl and a second core cowl. The support structure includes a plurality of first hinges, a plurality of second hinges, a plurality of longitudinal rails and a plurality of crossover rails spaced longitudinally along and connected to the longitudinal rails. Each of the first hinges is connected to a respective one of the crossover rails at a first distal end of the respective crossover rail. Each of the second hinges is connected to a respective one of the crossover rails at a second distal end of the respective crossover rail. The first core cowl is pivotally mounted to the support structure by the first hinges. The second core cowl is pivotally mounted to the support structure by the second hinges.

18 Claims, 11 Drawing Sheets

(56) References Cited

U.S. PATENT DOCUMENTS

| | | |
|---|---|---|
| 9,783,313 B2 | 10/2017 | Lacko |
| 10,167,741 B2 * | 1/2019 | Lacko ..................... F01D 25/32 |
| 2004/0227033 A1 * | 11/2004 | Picard .................... B64D 29/06 |
| | | 244/54 |
| 2005/0056726 A1 | 3/2005 | Mayes |
| 2006/0145001 A1 | 7/2006 | Smith |
| 2011/0127370 A1 | 6/2011 | Ramlaoui |
| 2015/0098810 A1 | 4/2015 | Soria |
| 2015/0143796 A1 | 5/2015 | Lacko |
| 2017/0015431 A1 * | 1/2017 | Antonacci ................ E04C 3/02 |
| 2017/0362957 A1 | 12/2017 | Lu |
| 2018/0346138 A1 | 12/2018 | Ridray |

* cited by examiner

SUPPORT STRUCTURE FOR INNER COWLS OF AN AIRCRAFT PROPULSION SYSTEM

CROSS-REFERENCE TO RELATED APPLICATIONS

This application claims priority to U.S. Provisional Patent Application No. 62/912,357 filed Oct. 8, 2019, which is hereby incorporated herein by reference in its entirety.

BACKGROUND

1. Technical Field

This disclosure relates generally to an aircraft propulsion system and, more particularly, to mounting cowls of an aircraft propulsion system.

2. Background Information

A system for mounting a thrust reverser to a pylon is disclosed in U.S. Pat. No. 9,714,627 (hereinafter "'627 patent") assigned to the assignee of the present disclosure and hereby incorporated herein by reference in its entirety. The '627 patent discloses mounting of an aircraft propulsion system outer sleeve and inner structure to a pylon with distinct hinges. FIG. 11 illustrates an inner fixed structure 237 (IFS) and an outer sleeve 231 that are separately coupled to a pylon 210, as disclosed in the '627 patent. The inner fixed structure 237 and the outer sleeve 231 may be hinged separately and attached to different parts and/or locations of the pylon 210. These hinge locations may comprise non-coaxial and generally parallel axes of rotation. For instance, the outer sleeve 231 may be hinged, via one or more hinges 218, 219 at locations 215, 216 of the pylon 210 generally above locations 240, 242. The inner fixed structure 237 may be hinged, via one or more hinges 245, 246 generally at locations 240, 242 of the pylon 210 generally below locations 215, 216. The hinges 218, 219 are not co-located with the hinges 245, 246, nor are the axes of rotation of the hinges 218, 219 coaxial with the axes of rotation of the hinges 245, 246.

While the mounting system disclosed in the '627 patent has various advantages, there is still room in the art for improvement.

SUMMARY OF THE DISCLOSURE

According to an aspect of the present disclosure, an assembly is provided for an aircraft propulsion system. This assembly includes a nacelle. The nacelle includes an outer structure and an inner structure. A bypass flowpath is formed by and radially between the outer structure and the inner structure. The inner structure includes a support structure, a first core cowl and a second core cowl. The support structure includes a plurality of first hinges, a plurality of second hinges, a plurality of longitudinal rails and a plurality of crossover rails. The crossover rails are spaced longitudinally along and connected to the plurality of longitudinal rails. Each of the first hinges is connected to a respective one of the crossover rails at a first distal end of the respective crossover rail. Each of the second hinges is connected to a respective one of the crossover rails at a second distal end of the respective crossover rail. The first core cowl is pivotally mounted to the support structure by the first hinges. The second core cowl is pivotally mounted to the support structure by the second hinges.

According to another aspect of the present disclosure, another assembly is provided for an aircraft propulsion system. This assembly includes a nacelle inner structure. This nacelle inner structure includes a ladder truss, a first core cowl, a second core cowl and a latch system. The first core cowl is pivotally mounted to the ladder truss on a first side of the ladder truss. The second core cowl is pivotally mounted to the ladder truss on a second side of the ladder truss that is laterally opposite the first side of the ladder truss. The latch system is configured to secure the first core cowl to the second core cowl while the first core cowl and the second core cowl are in closed positions. The ladder truss, the first core cowl and the second core cowl are configured to form a full hoop structure when the first core cowl is secured to the second core cowl by the latch system.

According to still another aspect of the present disclosure, another assembly is provided for an aircraft propulsion system. This assembly includes a nacelle inner structure. The nacelle inner structure includes a ladder truss, a first cowl, a second cowl and a firewall. The first cowl is pivotally mounted to the ladder truss on a first side of the ladder truss. The second cowl is pivotally mounted to the ladder truss on a second side of the ladder truss that is laterally opposite the first side of the ladder truss. The firewall longitudinally overlaps the ladder truss. The firewall extends laterally between the first cowl and the second cowl. The first cowl, the second cowl and the firewall form a full hoop inner barrel skin.

The longitudinal rails may be parallel.

The crossover rails may be parallel.

A first of the crossover rails may be perpendicular to a first of the longitudinal rails.

The support structure may be configured as or otherwise include a ladder truss.

A first of the crossover rails may extend laterally between and to the first distal end of the first of the crossover rails and the second distal end of the first of the crossover rails.

The assembly may also include a turbine engine case. A forward distal end of each of the longitudinal rails may be mounted to the turbine engine case.

The forward distal end of each of the longitudinal rails may be mounted to the turbine engine case by a respective pivot connection.

The assembly may also include a turbine engine case. An aft distal end of each of the longitudinal rails may be mounted to the turbine engine case.

The aft distal end of each of the longitudinal rails may be mounted to the turbine engine case by a respective pivot connection.

At least a portion of a first of the longitudinal rails may be configured with an I-shaped or a C-shaped cross-sectional geometry.

At least a portion of a first of the crossover rails may be configured with an I-shaped or a C-shaped cross-sectional geometry.

The support structure may also include a first mounting bracket, a second mounting bracket, an additional first hinge and an additional second hinge. The first mounting bracket may be mounted to and project laterally out from a first of the crossover rails in a first lateral direction. The additional first hinge may pivotally mount the first core cowl to the first mounting bracket. The second mounting bracket may be mounted to and project laterally out from a second of the crossover rails in a second lateral direction that is opposite the first lateral direction. The additional second hinge may pivotally mount the second core cowl to the second mounting bracket.

The support structure may also include a cross member connected to and laterally between the longitudinal rails. The cross member may be configured to transfer lateral loads between the additional first hinge and the additional second hinge.

A circumferential edge of the first core cowl may be next to a circumferential edge of the second core cowl when the first core cowl and the second core cowl are in closed positions.

The assembly may also include a latch system securing the first core cowl to the second core cowl when the first core cowl and the second core cowl are in closed positions.

The assembly may also include an intermediate skin connected to the support structure. The intermediate skin may extend longitudinally along the support structure. The intermediate skin may extend laterally between the first core cowl and the second core cowl.

The intermediate skin may be configured as or otherwise include a firewall.

The first core cowl may be configured from or otherwise include titanium.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
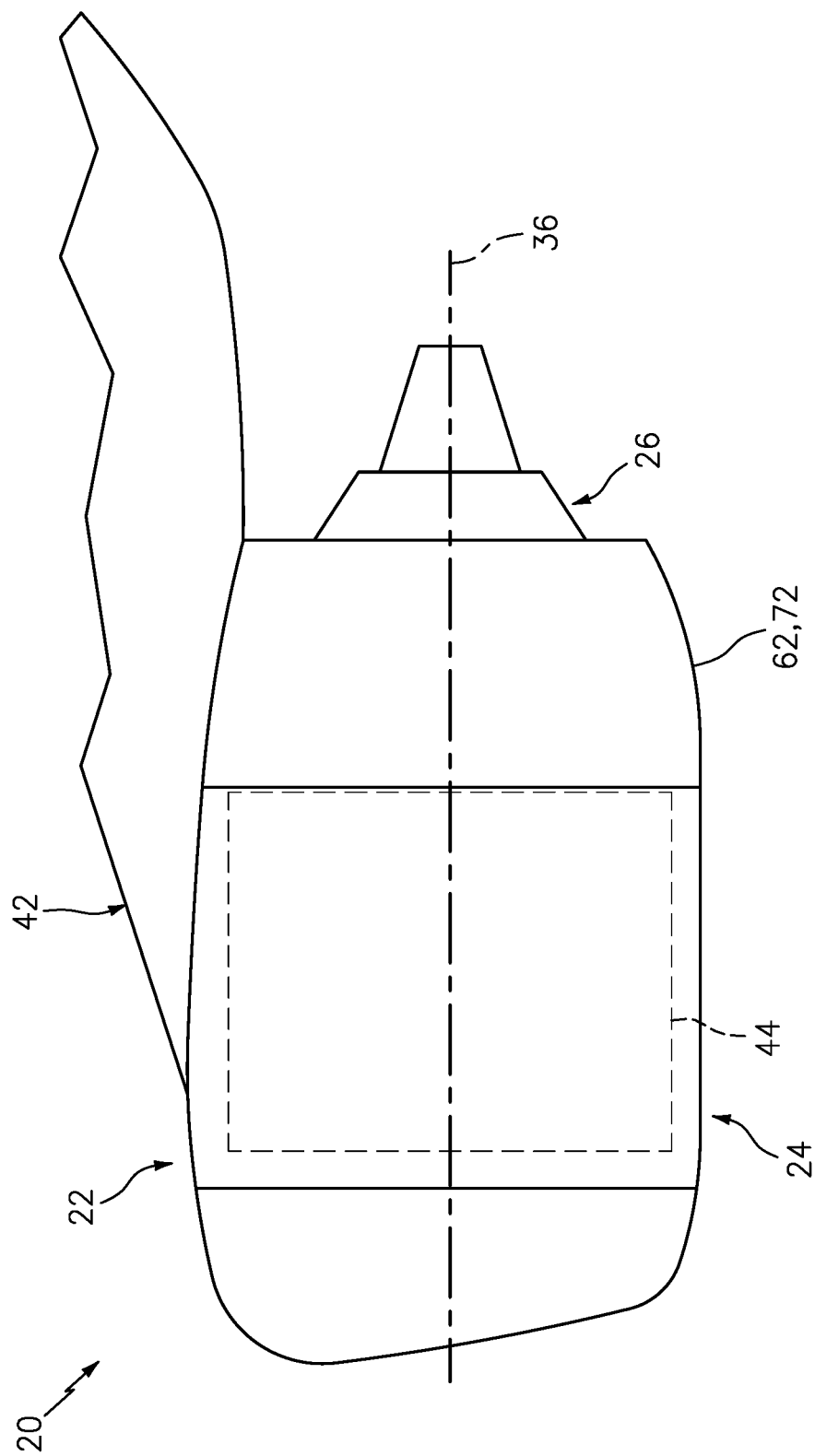
FIG. 1 is a side illustration of an aircraft propulsion system.

FIG. 1 illustrates an aircraft propulsion system 20 for an aircraft such as, but not limited to, a commercial airliner or a cargo plane. The propulsion system includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. The nacelle 22 of FIG. 1 includes a nacelle outer structure 24 and a nacelle inner structure 26, which inner structure 26 may sometimes be referred to as an inner fixed structure (IFS).

Figure 2:
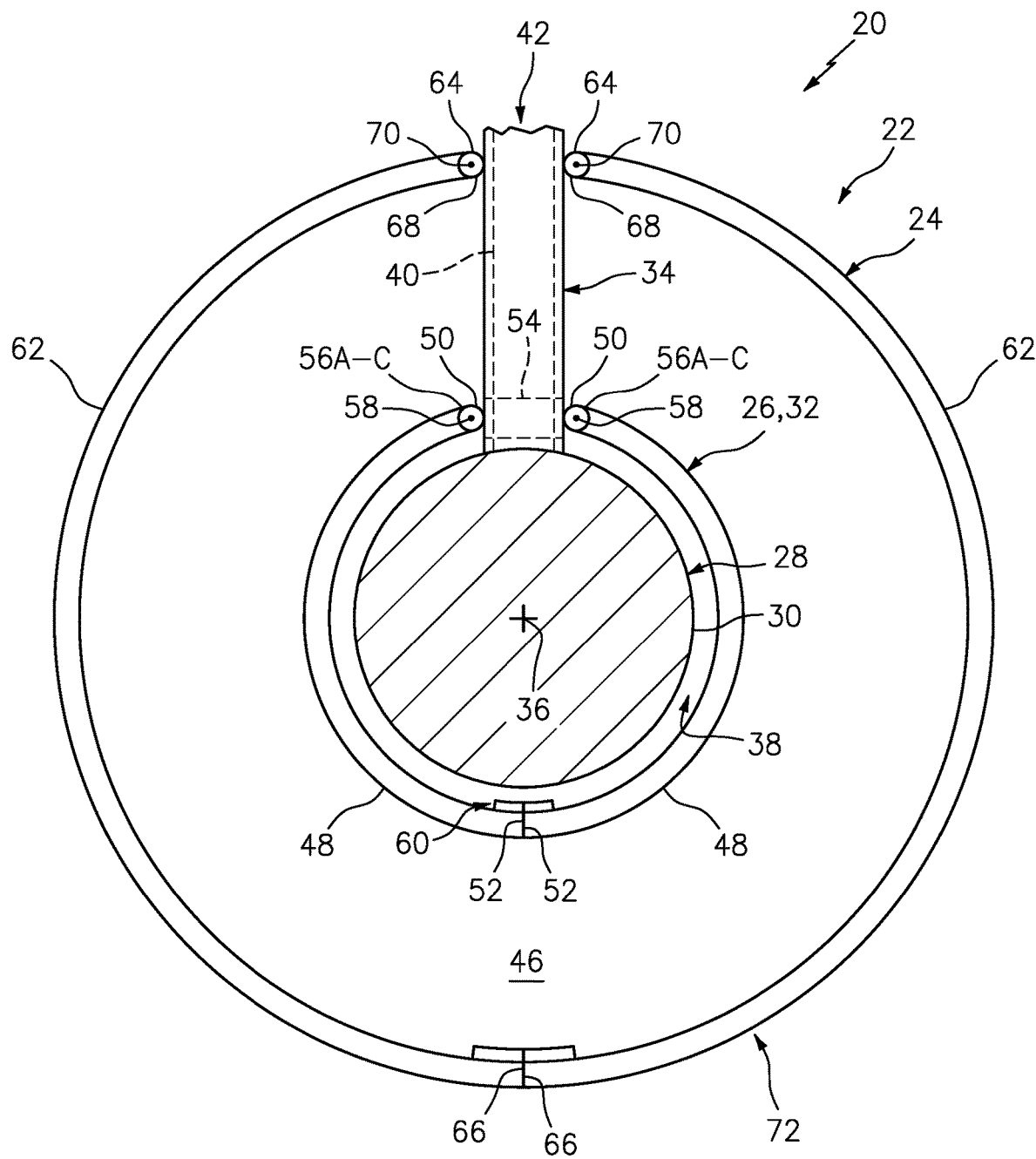
FIG. 2 is a cross-sectional illustration of a portion of the aircraft propulsion system with its inner and outer cowls in closed positions.

Referring to FIG. 2, the inner structure 26 covers a core 28 of the gas turbine engine. This engine core 28 may include a compressor section, a combustor section and a turbine section. The engine core 28 also includes a tubular turbine engine case 30 (e.g., a core case), which turbine engine case 30 at least partially or completely houses the compressor section, the combustor section and/or the turbine section. The turbine engine case 30 may be configured from one or more interconnected axial and/or circumferential case segments; e.g., discrete subcases mechanically and/or otherwise connected together to form the turbine engine case 30. The present disclosure, however, is not limited to the foregoing exemplary turbine engine case configuration.

The inner structure 26 includes a (e.g., tubular) inner barrel 32 and at least one bifurcation structure 34; e.g., an upper bifurcation cowl. The inner barrel 32 may be a generally cylindrical and/or barrel-shaped cowl that extends circumferentially around and axially along the engine core 28 and/or an axial centerline 36 of the aircraft propulsion system 20 and/or its gas turbine engine. The axial centerline 36 may also be coaxial with a rotational axis of the gas turbine engine.

The inner barrel 32 of FIG. 2 is shown with a circular and/or symmetrical cross-sectional geometry when viewed, for example, in a plane perpendicular to the axial centerline 36. However, in other embodiments, one or more axial portions of the inner barrel 32 or an entirety of the inner barrel 32 may alternatively have a non-circular (e.g., oblong, generally triangular, etc.) and/or non-symmetrical cross-sectional geometry when viewed, for example, in the plane perpendicular to the axial centerline 36. More particularly, the inner barrel 32 may be shaped to provide a completely developed outer aerodynamic flow surface. For example, in some embodiments, a gravitational bottom segment of the inner barrel 32 may be fatter/wider than a similarly located gravitational top segment of the inner barrel 32. The present disclosure, of course, is not limited to the foregoing exemplary inner barrel shapes/configurations.

The inner barrel 32 at least partially forms an internal compartment 38 (e.g., a core compartment) within the nacelle 22. This internal compartment 38 at least partially or completely houses the engine core 28 and its turbine engine case 30. The engine core 28 and its turbine engine case 30 are thereby arranged within the internal compartment 38.

The bifurcation structure 34 provides an aerodynamic housing for a pylon 40 which mounts the aircraft propulsion system 20 to a component of the aircraft; e.g., an aircraft wing, an aircraft fuselage, etc. Note, while the aircraft propulsion system 20 of FIG. 1 is shown for an underwing type application, the aircraft propulsion system 20 may alternatively be mounted for an above-wing or blended wing type application. The bifurcation structure 34 extends radially between the inner barrel 32 and the outer structure 24. The bifurcation structure 34 and/or the pylon 40 may each be configured as part of a fixed structure 42 of the aircraft propulsion system 20. Alternatively, the bifurcation structure 34 may be configured in such way that at least a portion of it is attached to the inner barrel 32. For example, at least side portions of the bifurcation structure 24 may be configured with (e.g., fixedly connected to and/or formed integral with) the inner barrel 32; e.g., each side portion may be configured with and, thus, pivotal with a respective cowl 48.

Referring to FIG. 1, the outer structure 24 covers a fan case 44 that circumscribes a fan section of the gas turbine engine. Referring to FIG. 2, the outer structure 24 covers at least a forward portion of the inner structure 26 and its inner barrel 32 so as to form a bypass duct and an associated bypass flowpath 46 radially between the outer structure 24 and the inner structure 26. The outer structure 24 may also be configured with a thrust reverser for redirecting airflow from the bypass flowpath 46 out of the nacelle 22 in a forward and/or outward direction. The present disclosure, however, is not limited to the foregoing exemplary general nacelle configuration.

Briefly, the bypass duct of FIG. 2 is configured as an O-Duct. The term "O-duct" may describe a duct through which only a single bifurcation extends between and connects a nacelle outer structure and a nacelle inner structure. By contrast, the term "C-Duct" or "D-duct" may describe a duct through which two bifurcations (e.g., an upper bifurcation and a lower bifurcation) extend between and connect a nacelle outer structure and a nacelle inner structure. Of course, although the exemplary duct shown in FIG. 2 is an O-duct, the present disclosure is not limited to any particular duct configurations. In particular, the present disclosure also contemplates the nacelle 22 having a C-duct or a D-duct.

Figure 3:
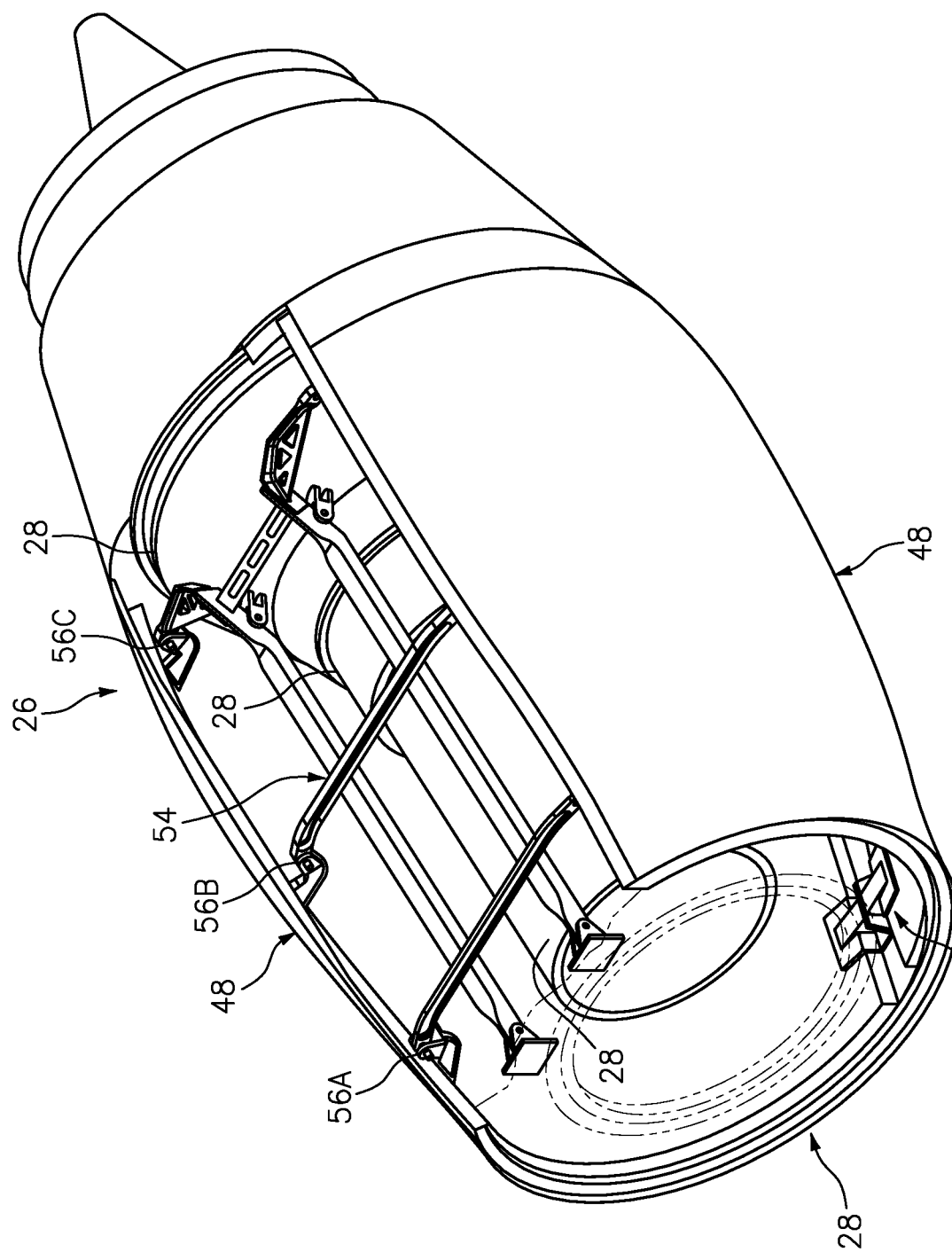
FIG. 3 is a partial perspective illustration of the aircraft propulsion system with its inner cowls in the closed positions.
Figure 4:
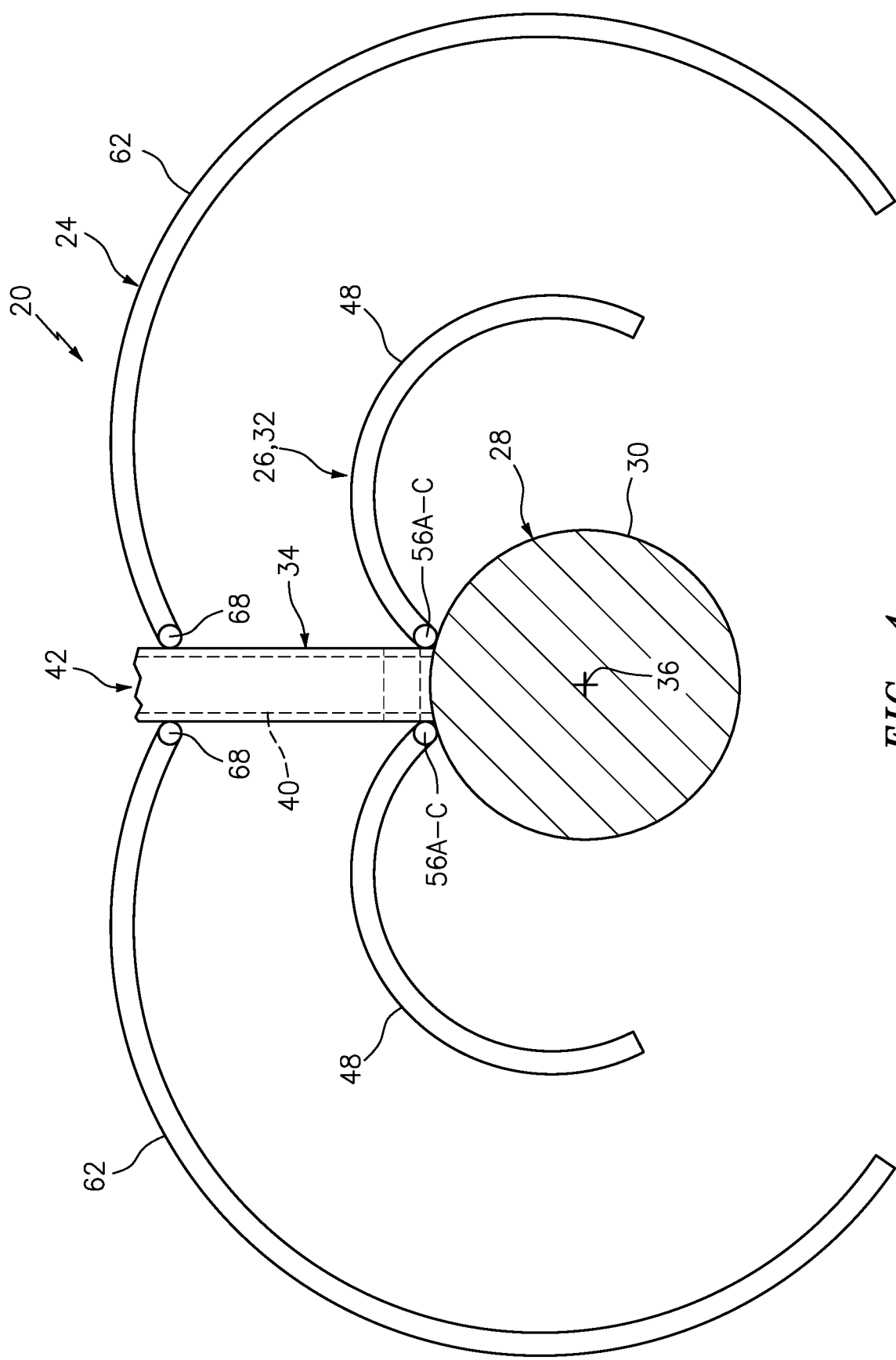
FIG. 4 is a cross-sectional illustration of a portion of the aircraft propulsion system with its inner and outer cowls in open positions.

Referring still to FIG. 2, the inner structure 26 may be configured with one or more movable (e.g., pivotable) inner structure components. These inner structure components may be configured as or otherwise include inner cowls 48; e.g., core cowls and/or inner cowl doors. Each of these inner cowls 48 extends circumferentially about the axial centerline 36. In particular, each inner cowl 48 extends circumferentially between an inner cowl first end 50 (e.g., upper edge) and an inner cowl second end 52 (e.g., lower edge). The inner cowl first end 50 is pivotally connected to a fixed support structure 54 (e.g., a barrel support structure) by one or more hinges 56A-C (generally referred to as "56") at an inner pivot axis 58. Each inner cowl 48 is thereby operable to move (e.g., pivot about the pivot axis 58) between an inner cowl closed position (position of FIGS. 2 and 3) and an inner cowl open position (position of FIGS. 4-6). Referring again to FIG. 2, the inner cowl second ends 52 of the inner cowls 48 may be configured to latch together via a latch system 60 so as to partially form the inner barrel 32. The latch system 60 may include one or more latches arranged axially along the inner cowl second ends 52, which latches secure the inner cowls 48 to one another when the inner cowls 48 are in their closed positions where the ends 52 are next to each other; e.g., side-by-side. Of course, in other embodiments, a stationary intermediate support may be arranged laterally between the inner cowl second ends 52 (e.g., at a 6 o'clock position), which intermediate support may be fixedly secured, for example, to the turbine engine case 30. The inner cowls 48 may thereby be latched to the intermediate support by the latch system 60 and, thus, latched together indirectly through the intermediate support. The present disclosure, however, is not limited to the foregoing exemplary latching techniques.

The outer structure 24 may be configured with one or more movable (e.g., pivotable) outer structure components. These outer structure components may be configured as or otherwise include outer cowls 62; e.g., outer cowl doors and/or thrust reverser halves. Each of these outer cowls 62 extends circumferentially about the axial centerline 36. In particular, each outer cowl 62 extends circumferentially between an outer cowl first end 64 (e.g., upper edge) and an outer cowl second end 66 (e.g., lower edge). The outer cowl first end 64 may be pivotally connected to the fixed structure 42 (e.g., the bifurcation structure 34 and/or the pylon 40) by, for example, a hinge 68 at an outer pivot axis 70, which outer pivot axes 70 are different than, non-coaxial with and/or radially outboard of the inner pivot axes 58. Each outer cowl door 62 is thereby operable to move (e.g., pivot about the pivot axis 70) between an outer cowl closed position (position of FIG. 2) and an outer cowl open position (position of FIGS. 4 and 6). Referring again to FIG. 2, the outer cowl second ends 66 of the outer cowls 62 may be configured to latch together so as to at least partially or completely form, for example, a translatable sleeve 72 of the outer structure 24; see also FIG. 1.

Figure 7:
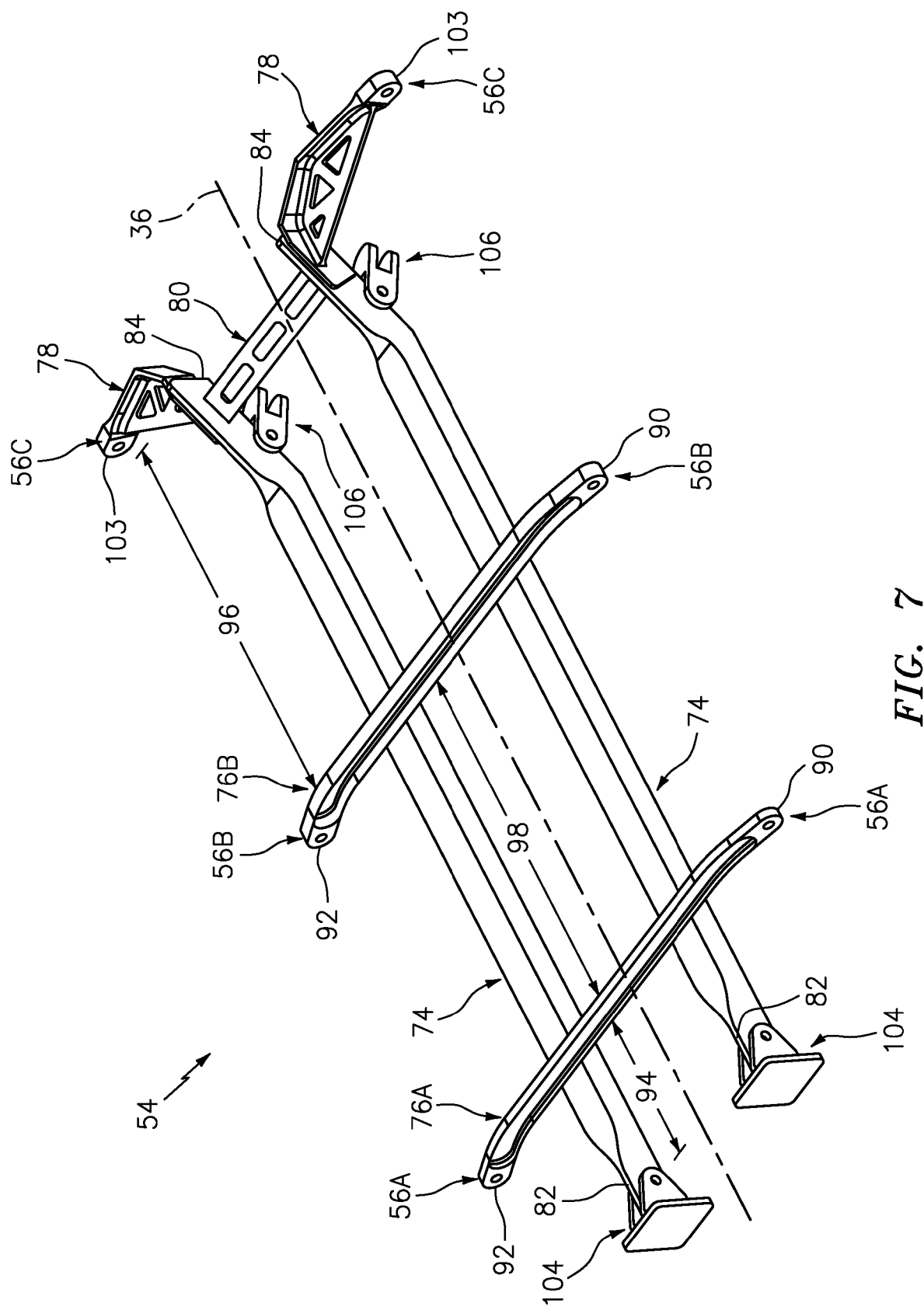
FIG. 7 is a perspective illustration of a support structure for the inner cowls.

Referring to FIG. 7, the support structure 54 may be configured as or otherwise include a ladder truss. The support structure 54 of FIG. 7, for example, includes one or more longitudinal rails 74 (e.g., axially extending base rails) and one or more laterally extending crossover rails 76A and 76B (generally referred to as "76") (e.g., circumferentially and/or tangentially extending cross rails). The support structure 54 of FIG. 7 also includes one or more mounting brackets 78 and a cross member 80 such as, for example, a support and/or brace; e.g., a lateral strut.

Each of the longitudinal rails 74 (also referred to as "longitudinal extending rails") extends longitudinally (e.g., axially along the axial centerline 36 in the embodiment of FIG. 7) between and to a longitudinal rail first end 82 (e.g., a forward end) and a longitudinal rail second end 84 (e.g., an aft end). The longitudinal rails 74 are laterally (e.g., circumferentially or tangentially) spaced from one another by a lateral gap.

The longitudinal rails 74 of FIG. 7 are arranged parallel with one another and with the axial centerline 36. However, in other embodiments, the longitudinal rails 74 may be angularly offset from and, thus, non-parallel with the axial centerline 36. One of the longitudinal rails 74 may also or alternatively be angularly offset from and, thus, non-parallel with another one of the longitudinal rails 74.

Figure 8A:
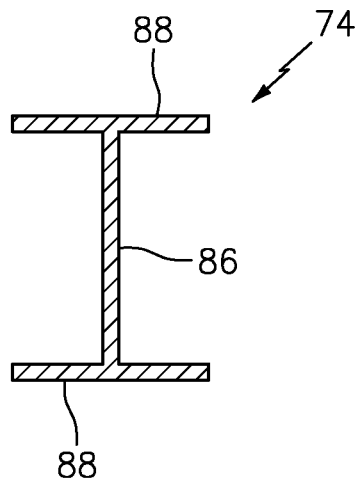
FIGS. 8A-C are illustrations of different cross-sectional configurations for a longitudinal rail.
Figure 8B:
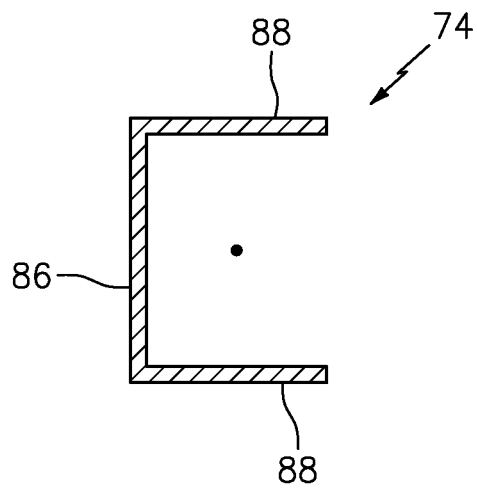
Figure 8C:
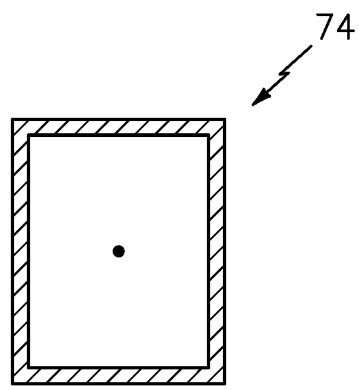

Referring to FIGS. 8A-8C, each of the longitudinal rails 74 may be configured as a structural beam. For example, referring to FIGS. 8A and 8B, at least a portion or an entirety of one or each of the longitudinal rails 74 may be configured with a web 86 extending between a pair of flanges 88. The longitudinal rail 74 of FIG. 8A, for example, is configured with an I-shaped cross-sectional geometry when viewed, for example, in a plane perpendicular to a longitudinal centerline of the respective rail 74 (e.g., the plane of FIG. 8A). The longitudinal rail 74 of FIG. 8B, in another example, is configured with a C-shaped (or U-shaped depending on orientation) cross-sectional geometry when viewed, for example, in a plane perpendicular to the longitudinal centerline of the respective rail 74 (e.g., the plane of FIG. 8B). The present disclosure, however, is not limited to the foregoing exemplary cross-sectional geometries. For example, in other embodiments, one or each of the longitudinal rails 74 may have a tubular (e.g., fully boxed) cross-sectional geometry as shown, for example, in FIG. 8C.

Referring again to FIG. 7, each of the crossover rails 76 (also referred to as "laterally extending rails") extending laterally (e.g., tangentially and circumferentially about the axial centerline 36 in the embodiment of FIG. 7) between and to a crossover rail first end 90 at a first side of the support structure 54 and a crossover rail second end 92 at a second side of the support structure 54 which is laterally opposite the support structure first side. The crossover rails 76 are longitudinally (e.g., axially) spaced from one another by a longitudinal gap. The first (e.g., forward) crossover rail 76A is disposed a first (e.g., non-zero) longitudinal distance 94 from the longitudinal rail first ends 82. The second (e.g., aft) crossover rail 76B is disposed a second (e.g., non-zero) longitudinal distance 96 from the longitudinal rail second ends 84, which second longitudinal distance 96 may be greater than the first longitudinal distance 94. A third (e.g., non-zero) longitudinal distance 98 between the first and the second crossover rails 76 may be greater than the first longitudinal distance 94. The third longitudinal distance 98 may also or alternatively be equal to or different (e.g., greater or less) than the second longitudinal distance 96.

The crossover rails 76 of FIG. 7 are arranged parallel with one another and perpendicular with the axial centerline 36. However, in other embodiments, the crossover rails 76 may be angularly offset from the axial centerline 36 by an acute or an obtuse angle. One of the crossover rails 76 may also or alternatively be angularly offset from and, thus, non-parallel with another one of the crossover rails 76.

Figure 9A:
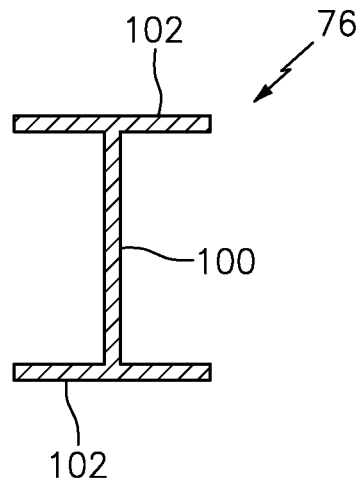
FIGS. 9A-C are illustrations of different cross-sectional configurations for a crossover rail.
Figure 9B:
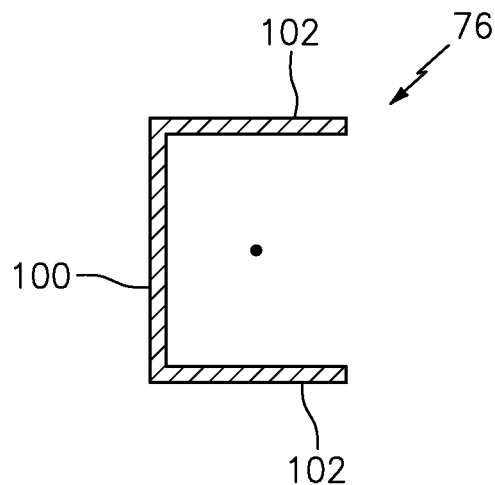
Figure 9C:
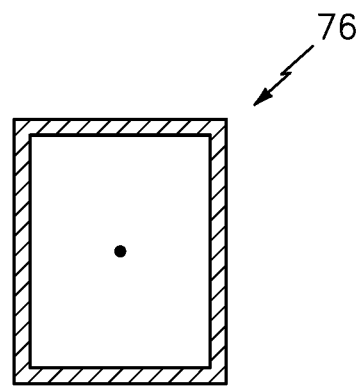

Referring to FIGS. 9A-9C, each of the crossover rails 76 may be configured as a structural beam. For example, referring to FIGS. 9A and 9B, at least a portion or an entirety of one or each of the crossover rails 76 may be configured with a web 100 extending between a pair of flanges 102. The crossover rail 76 of FIG. 9A, for example, is configured with an I-shaped cross-sectional geometry when viewed, for example, in a plane perpendicular to a lateral centerline of the respective rail 76 (e.g., the plane of FIG. 9A). The crossover rail 76 of FIG. 9B, in another example, is configured with a C-shaped (or U-shaped depending on orientation) cross-sectional geometry when viewed, for example, in a plane perpendicular to the lateral centerline of the respective rail 76 (e.g., the plane of FIG. 9B). The present disclosure, however, is not limited to the foregoing exemplary cross-sectional geometries. For example, in other embodiments, one or each of the crossover rails 76 may have a tubular (e.g., fully boxed) cross-sectional geometry as shown, for example, in FIG. 9C.

Referring again to FIG. 7, the mounting brackets 78 are arranged at (e.g., on, adjacent or proximate) the longitudinal rail second ends 84, where the longitudinal rails 74 are laterally between the mounting brackets 78. Each mounting bracket 78 is connected to a respective one of the longitudinal rails 74. Each mounting bracket 78 projects laterally out from (e.g., is cantilevered from) the respective longitudinal rail 74 to a respective distal lateral end 103 of that mounting bracket 78. The mounting brackets 78 of FIG. 7 are longitudinally aligned with one another.

The cross member 80 is arranged laterally between and extends laterally between the longitudinal rails 74. The cross member 80 is connected to the longitudinal rails 74. The cross member 80 of FIG. 7 is longitudinally aligned with and/or otherwise positioned relative to the mounting brackets 78 so as to provide a lateral load transfer path between the mounting brackets 78 and the hinges 56C.

Figure 5:
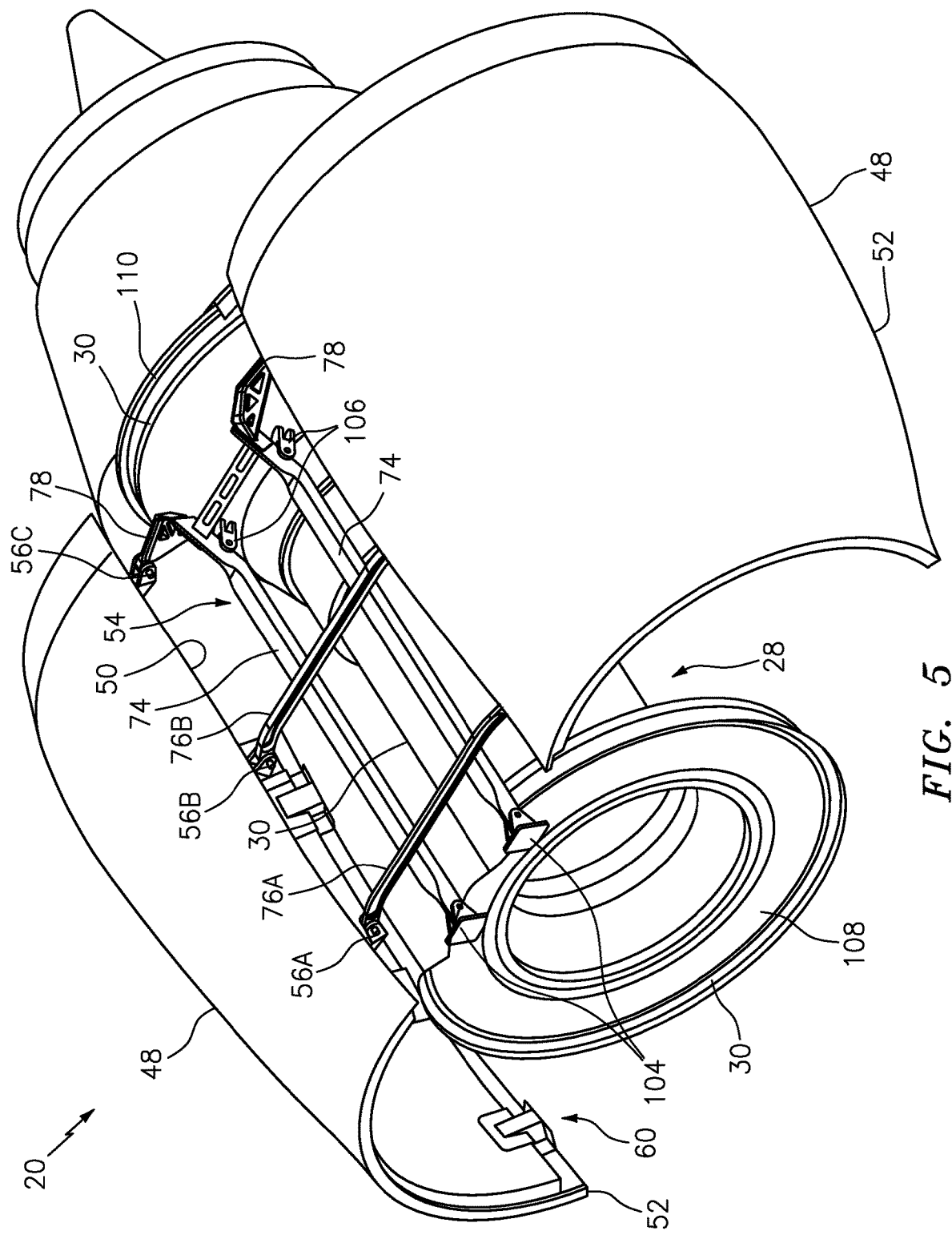
FIG. 5 is a partial perspective illustration of the aircraft propulsion system with its inner cowls in the open positions.
Figure 6:
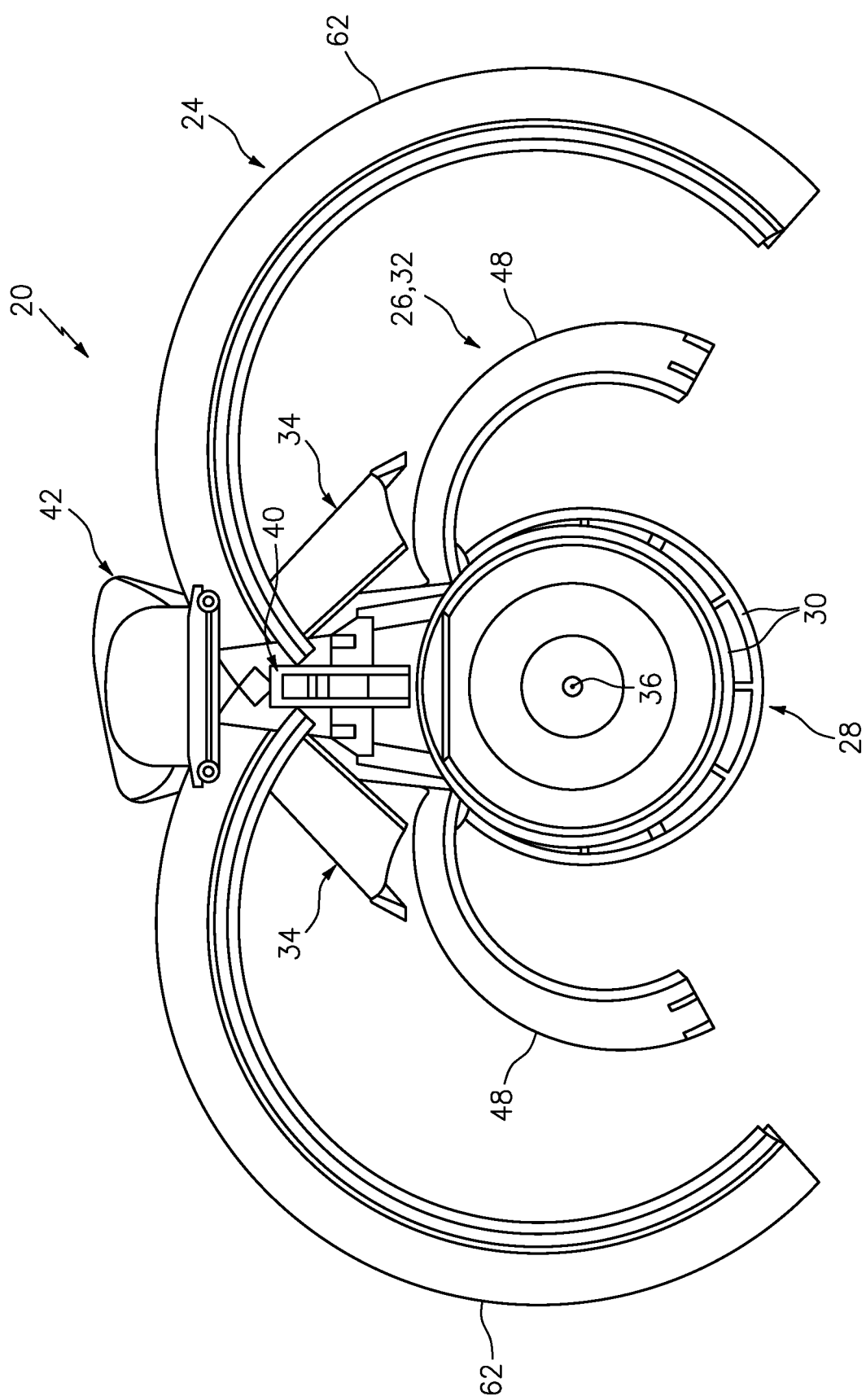
FIG. 6 is a partial perspective illustration of the aircraft propulsion system with its inner and outer cowls in the open positions.

Referring to FIG. 5, the support structure 54 is mounted to the engine core 28 and, more particularly, the turbine engine case 30. Each longitudinal rail 74, for example, is mounted to the turbine engine case 30 at its first end 82 via a first attachment 104 (see also FIG. 7). Each first attachment 104 may be configured to provide a moveable (e.g., pivot) joint between the respective longitudinal rail 74 and the turbine engine case 30; however, the present disclosure is not limited thereto. Each longitudinal rail 74 is mounted to the turbine engine case 30 at its second end 84 via a second attachment 106 (see also FIG. 7). Each second attachment 106 may be configured to provide a moveable (e.g., pivot) joint between the respective longitudinal rail 74 and the turbine engine case 30; however, the present disclosure is not limited thereto. In the specific embodiment of FIG. 5, the first attachment 104 is mounted to an engine intermediate case 108; e.g., a segment of the turbine engine case 30 arranged about the compressor section. The second attachment 106 is mounted to an engine turbine case 110; e.g., a segment of the turbine engine case 30 arranged about the turbine section. Of course, in other embodiments, the first and/or the second attachments 104 and/or 106 may be mounted to other segments of the turbine engine case 30 and/or other fixed structures of the aircraft propulsion system 20. Furthermore, while the first and the second attachments 106 may be the only attachments between the support structure 54 and the gas turbine engine, additional attachments may alternatively also be included.

Each of the inner cowls 48 is pivotally mounted to a respective side of the support structure 54 by the hinges 56. More particularly, each of the hinges 56A and 56B pivotally mounts a respective inner cowl 48 to a respective crossover rails 76 at its distal end 90, 92 (see also FIG. 7). Each of the hinges 56C pivotally mounts a respective inner cowl 48 to a respective mounting bracket 78 at its distal end 103 (see also FIG. 7). Thus, when the inner cowls 48 are in their closed positions (see FIG. 3) and secured together by the latch system 60 (see FIG. 2), at least (or only) the inner structure members (e.g., 48 and 54) are configured to form a full hoop structure.

Figure 10:
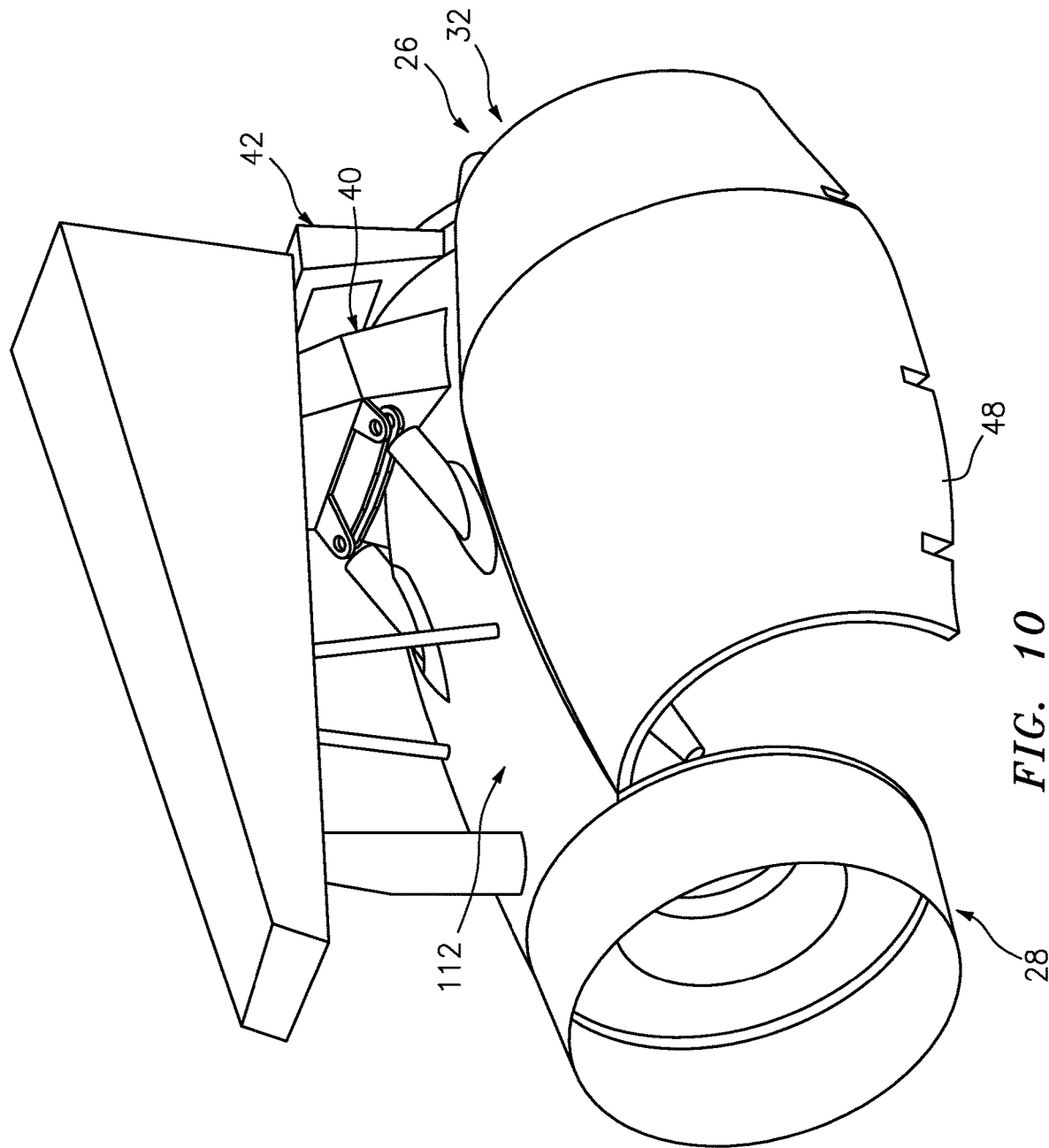
FIG. 10 is a cross-sectional illustration of a portion of the aircraft propulsion system with its inner cowls in open positions.
Figure 11:
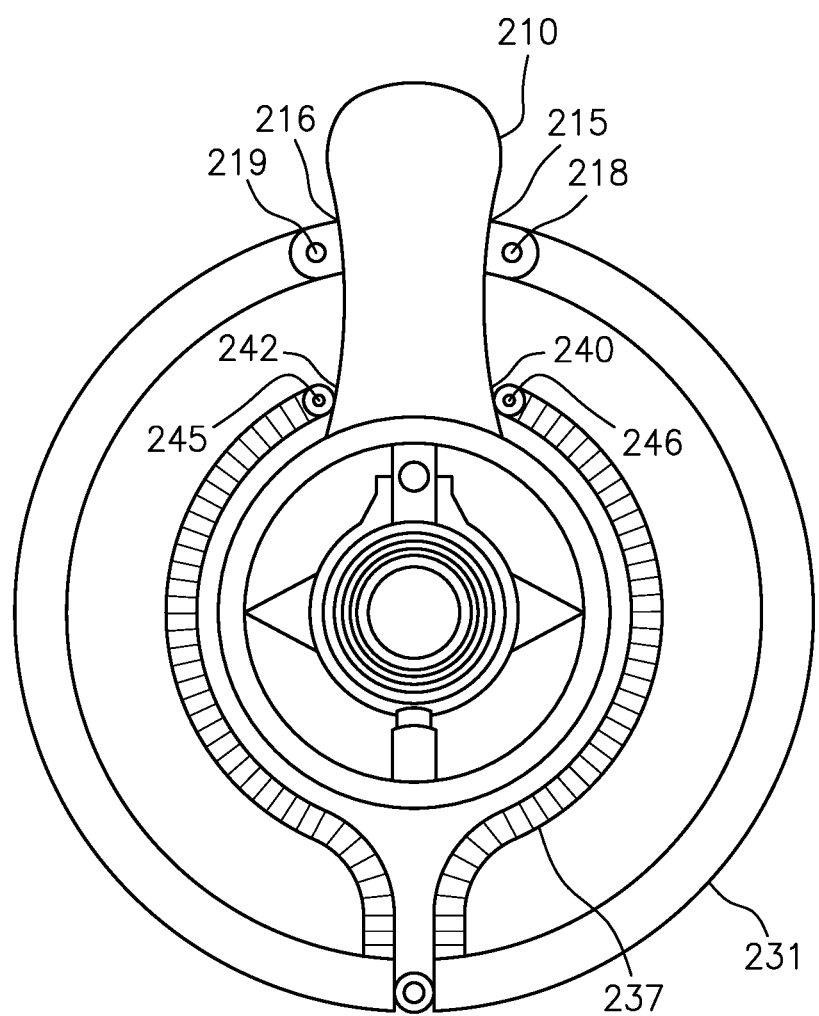
FIG. 11 is a cross-sectional illustration of a portion of a prior art aircraft propulsion system.

Referring to FIG. 10, the inner structure 26 may include a firewall 112 (or another intermediate skin which may or may not function as a firewall) configured with the support structure 54 (not visible in FIG. 10; see FIG. 5). The firewall 112 of FIG. 10 extends axially along and (e.g., partially or completely) axially overlaps the support structure 54. The firewall 112 of FIG. 10 also extends laterally between and to the inner cowls 48 and thereby (e.g., partially or completely) laterally overlaps the support structure 54. The firewall 112 provides a barrier between the engine core 28 and an area surrounding the engine core 28 and circumferentially aligned with the fixed structure 42. The firewall 112 may thereby complete an enclosure about the engine core 28 (e.g., seal the internal compartment 38) such that the inner barrel 32 has a full hoop inner barrel skin. With this configuration, components radially outboard of the inner barrel 32 and its firewall 112 may be configured from structural material which may or may not be fire resistant; e.g., light weight composite materials.

In some embodiments, the firewall 112 may be configured as a single body. In other embodiments, the firewall 112 may be configured from a plurality of discrete panels.

In some embodiments, one or more or each of the inner structure members (e.g., 48 and 112) may be configured from or otherwise include a fire-resistance material such as, but not limited to, metal. An example of a metal is, but is not limited to, titanium (Ti), which titanium may be pure titanium or titanium alloy.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
a nacelle comprising an outer structure and an inner structure, a bypass flowpath formed by and radially between the outer structure and the inner structure;
the inner structure including a support structure, a first core cowl and a second core cowl;
the support structure including a plurality of first hinges, a plurality of second hinges, a plurality of longitudinal rails and a plurality of crossover rails spaced longitudinally along and connected to the plurality of longitudinal rails, each of the plurality of first hinges connected to a respective one of the plurality of crossover rails at a first distal end of the respective one of the plurality of crossover rails, each of the plurality of second hinges connected to a respective one of the plurality of crossover rails at a second distal end of the respective one of the plurality of crossover rails;
the first core cowl pivotally mounted to the support structure by the plurality of first hinges;
the second core cowl pivotally mounted to the support structure by the plurality of second hinges;
the support structure further including a first mounting bracket, a second mounting bracket, an additional first hinge and an additional second hinge;
the first mounting bracket mounted to and projecting laterally out from a first of the plurality of crossover rails in a first lateral direction, and the additional first hinge pivotally mounting the first core cowl to the first mounting bracket; and
the second mounting bracket mounted to and projecting laterally out from a second of the plurality of crossover rails in a second lateral direction that is opposite the first lateral direction, and the additional second hinge pivotally mounting the second core cowl to the second mounting bracket.

2. The assembly of claim 1, wherein the plurality of longitudinal rails are parallel.

3. The assembly of claim 1, wherein the plurality of crossover rails are parallel.

4. The assembly of claim 1, wherein a first of the plurality of crossover rails is perpendicular to a first of the plurality of longitudinal rails.

5. The assembly of claim 1, wherein the support structure comprises a ladder truss.

6. The assembly of claim 1, wherein a first of the plurality of crossover rails extends laterally between and to the first distal end of the first of the plurality of crossover rails and the second distal end of the first of the plurality of crossover rails.

7. The assembly of claim 1, further comprising:
a turbine engine case;
a forward distal end of each of the plurality of longitudinal rails mounted to the turbine engine case.

8. The assembly of claim 7, wherein the forward distal end of each of the plurality of longitudinal rails is mounted to the turbine engine case by a respective pivot connection.

9. The assembly of claim 1, further comprising:
a turbine engine case;
an aft distal end of each of the plurality of longitudinal rails mounted to the turbine engine case.

10. The assembly of claim 9, wherein the aft distal end of each of the plurality of longitudinal rails is mounted to the turbine engine case by a respective pivot connection.

11. The assembly of claim 1, wherein at least a portion of a first of the plurality of longitudinal rails is configured with an I-shaped or a C-shaped cross-sectional geometry.

12. The assembly of claim 1, wherein at least a portion of a first of the plurality of crossover rails is configured with an I-shaped or a C-shaped cross-sectional geometry.

13. The assembly of claim 1, wherein
the support structure further includes a cross member connected to and laterally between the plurality of longitudinal rails; and
the cross member is configured to transfer lateral loads between the additional first hinge and the additional second hinge.

14. The assembly of claim 1, wherein a circumferential edge of the first core cowl is next to a circumferential edge of the second core cowl when the first core cowl and the second core cowl are in closed positions.

15. The assembly of claim 1, further comprising a latch system securing the first core cowl to the second core cowl when the first core cowl and the second core cowl are in closed positions.

16. The assembly of claim 1, further comprising
an intermediate skin connected to the support structure;
the intermediate skin extending longitudinally along the support structure; and
the intermediate skin extending laterally between the first core cowl and the second core cowl.

17. The assembly of claim 1, wherein the first core cowl comprises titanium.

18. The assembly of claim 1, wherein the outer structure circumscribes the inner structure, and the outer structure is spaced radially outboard from the first core cowl and the second core cowl.

* * * * *